United States Patent
James

(10) Patent No.: US 8,701,766 B2
(45) Date of Patent: Apr. 22, 2014

(54) APPARATUS AND METHODS FOR COMPLETING SUBTERRANEAN WELLS

(75) Inventor: Simon James, Le Plessis-Robinson (FR)

(73) Assignee: Schlumberger Technology Corporation, Sugar Land, TX (US)

(*) Notice: Subject to any disclaimer, the term of this patent is extended or adjusted under 35 U.S.C. 154(b) by 435 days.

(21) Appl. No.: 13/099,731

(22) Filed: May 3, 2011

(65) Prior Publication Data

US 2011/0284221 A1 Nov. 24, 2011

(30) Foreign Application Priority Data

May 19, 2010 (EP) .................................... 10290267

(51) Int. Cl.
*E21B 33/14* (2006.01)
*E21B 43/26* (2006.01)
*E21B 43/27* (2006.01)

(52) U.S. Cl.
USPC ........... 166/281; 166/285; 166/300; 166/307; 166/308.1; 166/902

(58) Field of Classification Search
None
See application file for complete search history.

(56) References Cited

U.S. PATENT DOCUMENTS

| | | | |
|---|---|---|---|
| 3,880,233 A | 4/1975 | Muecke et al. | |
| 3,905,423 A | 9/1975 | Sparlin et al. | |
| 3,918,523 A | 11/1975 | Stuber | |
| 5,709,269 A | 1/1998 | Head | |
| 6,935,432 B2 | 8/2005 | Nguyen | |
| 7,322,412 B2 * | 1/2008 | Badalamenti et al. | 166/285 |
| 7,360,593 B2 | 4/2008 | Constien | |
| 7,461,699 B2 | 12/2008 | Richard et al. | |
| 2005/0167105 A1 | 8/2005 | Roddy et al. | |
| 2005/0199401 A1 | 9/2005 | Patel et al. | |
| 2006/0042798 A1 * | 3/2006 | Badalamenti et al. | 166/285 |
| 2006/0169448 A1 | 8/2006 | Savery et al. | |
| 2009/0255686 A1 * | 10/2009 | Richard et al. | 166/376 |
| 2010/0016183 A1 | 1/2010 | Roddy et al. | |
| 2013/0037267 A1 * | 2/2013 | Regnault De La Mothe et al. | 166/293 |

FOREIGN PATENT DOCUMENTS

EP 1978071 10/2008

OTHER PUBLICATIONS

Luke K and Soucy K: "Test Method to Optimize Acid-Soluble Cement for Unconventional Gas Completions," paper SPE 114759, presented at the CIPC/SPE Gas Technology Symposium 2008 Joing Conference held in Calgary, Alberta, Canada (16-19 2008).
Economides MC, Watters LT and Dunn-Norman S (eds.), "Petroleum Well Construction," John Wiley & Sons (1988).
Nelson EB and Guillot D (eds.), "Well Cementing," 2nd Edition, Schlumberger (2006).
Economides MC and Nolte KG (eds.), "Reservoir Stimulation," 3rd Edition, John Wiley & Sons (2000).

* cited by examiner

*Primary Examiner* — George Suchfield
(74) *Attorney, Agent, or Firm* — Michael Dae

(57) ABSTRACT

The external surface of a tubular body such as well casing is coated with a substance that, upon exposure to cement, is unstable and degrades. After installation in a subterranean well and subsequent cementation, the coating degrades and forms a gap between the external surface of the tubular body and the cement sheath. Forming the gap is useful for obtaining optimal stimulation during the hydraulic fracturing of unconventional shale-gas formations.

14 Claims, 2 Drawing Sheets

APPARATUS AND METHODS FOR COMPLETING SUBTERRANEAN WELLS

CROSS-REFERENCED APPLICATIONS

This application claims the benefit of the disclosure of European Patent Application No EP10290267.3 filed on May 19, 2010 incorporated by reference in its entirety.

BACKGROUND

The statements in this section merely provide background information related to the present disclosure and may not constitute prior art.

This disclosure relates to equipment and methods for completing subterranean wells; in particular, wells that produce fluids originating within shale formations.

During completion of a subterranean well, drilling and cementing operations are performed to provide a conduit through which desirable fluids originating within the formation may flow. The cementing operation involves placing a competent cement sheath inside the annular region between the external surface of a tubular body such as well casing, and the borehole wall. The cement sheath supports the casing and provides a hydraulic seal between producing formations. The presence of a hydraulic seal is commonly referred to as zonal isolation.

Operators gain access to desired formation fluids by creating perforations that penetrate the casing and cement sheath, and extend into the formation. Formation fluid then flows into the casing interior and travels through the casing until it reaches a collection facility.

The formation-fluid production rate may be increased by performing stimulation treatments. Such treatments usually involve the injection of fluids through the perforations into the producing formation, with the goal of increasing the formation permeability. The treatments may involve matrix acidizing, hydraulic fracturing or both.

The aforementioned procedures are well known in the industry and have become highly sophisticated after decades of innovation and development. More complete information regarding the aforementioned procedures may be found in the following publications: Economides M C, Watters L T and Dunn-Norman S (eds.): *Petroleum Well Construction*, John Wiley & Sons (1988); Nelson E B and Guillot D (eds.): Well Cementing, 2$^{nd}$ Edition, Schlumberger (2006); Economides M C and Nolte K G (eds.): *Reservoir Stimulation*, 3$^{rd}$ Edition, John Wiley & Sons (2000).

Despite the advancements in well-completion technologies, difficulties frequently arise when the industry begins to exploit new types of formations. For example, it has been known for many years that large deposits of natural gas reside in some very low permeability shale formations. Notable examples are the Barnett Shale in Texas, the Woodford Shale which extends from Kansas to West Texas, and the Horn River Basin/Muskwa Shale in British Columbia, Canada. Such formations, whose permeabilities are in the microdarcy range, could not be exploited economically until horizontal-well technologies became widely available in the early 2000s. Today they are commonly called "unconventional gas" reservoirs.

One of the difficulties associated with completing unconventional gas reservoirs is related to hydraulic fracturing operations. The horizontal well usually extends through a shale stratum, and numerous sets of perforations are created along the wellbore to maximize exposure to the gas. Some of the perforations may not be aligned with the minimum stress plane, which defines the direction the fracture will tend to extend outward, away from the wellbore, as the fracturing fluid flows through the perforations. In such cases, the cement sheath often interferes with fracturing-fluid flow. The fluid must find a path around the cement sheath before reaching the preferred flow direction; as a result, there may be a choke effect. This condition is known as "near-wellbore tortuosity," and is particularly problematic when the producing formation has low permeability. Failure to overcome this problem may significantly limit the effectiveness of the hydraulic fracturing treatment, and reduce the economic viability of the well.

For several years, the industry has overcome the stimulation problem by substituting conventional Portland cements with acid-soluble cements (ASCs). The most common ASCs are magnesium oxychloride (or Sorel) cement or conventional cements embedded with acid-soluble particles such as calcium carbonate. After the well is perforated, a matrix acidizing treatment is performed. The acid dissolves some of the cement around the perforations, thereby minimizing the choke effect and improving the outcome of the subsequent hydraulic-fracturing treatment.

There are some drawbacks associated with the use of ASCs. For example the method requires the step of performing an acidizing treatment before the fracturing treatment; furthermore, there is a risk that the acid may dissolve the cement sheath between two or more sets of perforations, leading to reduced control of the fracturing treatment.

As apparent, despite the valuable contributions of the prior art, it would be beneficial to have techniques that overcome the aforementioned drawbacks.

SUMMARY

The present disclosure pertains to an apparatus and methods that allow the use of conventional well cements, eliminate the need for an acidizing treatment before a hydraulic-fracturing treatment, and eliminate the risk of hydraulic communication between two or more sets of perforations.

In an aspect, embodiments relate to an apparatus for completing a subterranean well, comprising a tubular body and a degradable coating along the external surface of the tubular body, wherein the coating becomes unstable and undergoes degradation upon exposure to a well cement.

In further aspects, embodiments aim at methods for cementing a subterranean well comprising a borehole wall.

In yet further aspects, embodiments aim at methods for completing a subterranean well comprising a borehole wall.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

As discussed earlier, improved equipment and procedures for completing unconventional gas wells would be beneficial. The present disclosure is aimed at a less onerous technique whereby the effects of near-wellbore tortuosity during hydraulic-fracturing operations may be mitigated. The disclosure is also aimed at preventing hydraulic communication between sets of perforations during hydraulic-fracturing operation.

Figure 1:
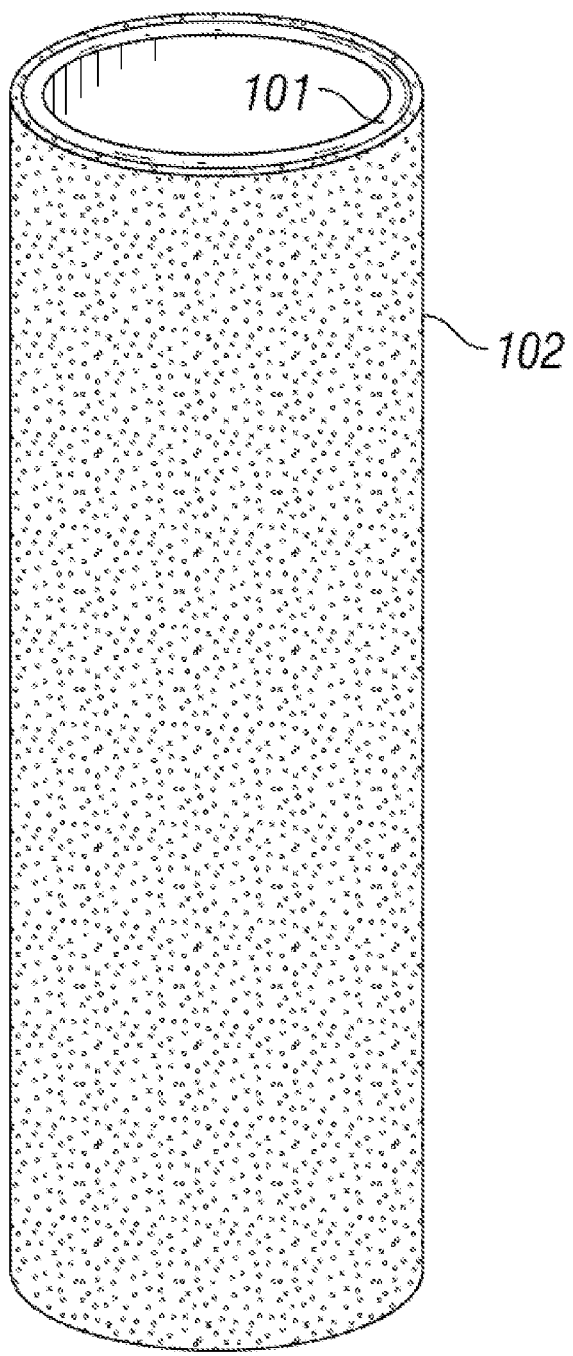
FIG. 1 depicts a tubular body, coated by a degradable coating along its outside surface.
Figure 2:
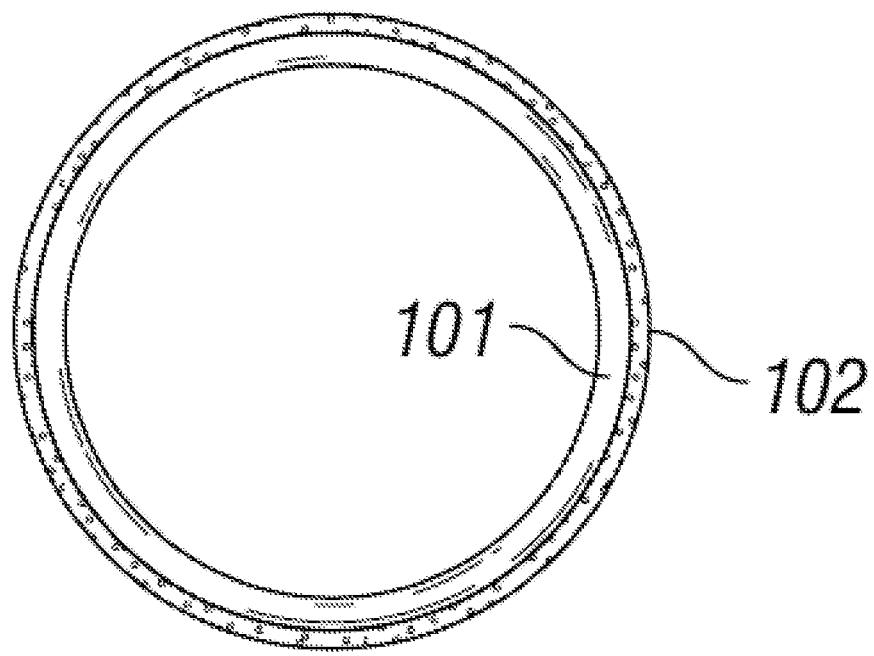
FIG. 2 is a top view of the tubular body coated by the degradable coating.

As illustrated in FIGS. 1 and 2, the present disclosure relates to an apparatus comprising a tubular body 101 and a degradable coating 102 that is applied to the external surface of the tubular body. The coating is designed to be unstable and degradable when exposed to a well cement. It will be appreciated that the tubular body may be drillpipe, casing, coiled tubing or a combination thereof. The coating may be continuous along the entire tubular body, or discontinuous—applied only at strategic locations where the operator plans to perforate. The coating is preferably applied to the tubular body before installation inside a subterranean well.

The degradable coating may be selected from one or more members of the list comprising polyamides, polycarbonates and polyesters. Of these, polyglycolic acid and polylactic acid are preferred. The polymer molecular weight may be between about 1000 and 1,000,000, preferably between about 5000 and 100,000. The coating thickness may be between about 40 µm and 1 cm, preferably between about 0.2 mm and 5 mm.

The aforementioned coatings become unstable and degrade when exposed to an alkaline-pH environment. Without wishing to be bound by any theory, it is believed that the degradation mechanism is hydrolysis, leading to a molecular-weight reduction. Such an environment may be provided by many well cements, comprising one or more members of the list comprising Portland cement, calcium aluminate cement, fly ash, blast furnace slag, lime-silica blends and chemically bonded phosphate ceramics.

After a cementing treatment, the coating degrades in the presence of the cement sheath, liberating space and creating a gap between the external casing surface and the cement sheath. In addition, the coating-hydrolysis products are generally acidic, and thus provide for additional cement degradation around the coating, resulting in a further widening of the gap. As described earlier, the gap minimizes near-wellbore tortuosity, thereby improving the efficiency of a hydraulic-fracturing treatment. It will be appreciated that complete coating degradation is not required in the present context.

In further aspects, the disclosure relates to methods for cementing a subterranean well comprising a borehole wall. A coating is applied to the external surface of a tubular body, wherein, in the presence of a well cement, the coating undergoes degradation. Generally, the tubular body is then installed in the subterranean well. When cement is place in the annular region between the external surface of the tubular body and the borehole wall it creates a cement sheath. This cement sheath creates an alkaline environment allowing the coating to degrade, thereby creating a gap between the cement sheath and the external surface of the tubular body.

Yet further aspects relate to methods for completing a subterranean well comprising a borehole wall. A coating is applied to the external surface of a tubular body, wherein, in the presence of a well cement, the coating undergoes degradation. Generally, the tubular body is then installed in the subterranean well. When cement is place in the annular region between the external surface of the tubular body and the borehole wall it creates a cement sheath. This cement sheath creates an alkaline environment allowing the coating to degrade, thereby creating a gap between the cement sheath and the external surface of the tubular body. At this point, one or more hydraulic-fracturing treatments can be performed through the perforations.

It will be appreciated that the casing may be perforated at any time within the period from when the cement sheath has hardened, to when the hydraulic-fracturing treatment is performed. It will also be appreciated that an acidizing treatment may, in some situations, be necessary before performing the hydraulic-fracturing treatment. Such situations include the need to remove perforating debris or near-wellbore formation damage.

For all methods disclosed herein, the degradable coating may be selected from one or more members of the list comprising polyamides, polycarbonates and polyesters. Of these, polyglycolic acid and polylactic acid are preferred. The polymer molecular weight may be between about 1000 and 1,000,000, preferably between about 5000 and 100,000. The coating thickness may be between about 40 µm and 1 cm, preferably between about 0.2 mm and 5 mm The well cement, may comprise one or more members of the list comprising Portland cement, calcium aluminate cement, fly ash, blast furnace slag, lime-silica blends and chemically bonded phosphate ceramics.

For all aspects, the tubular body may comprise one or more members of the list comprising drillpipe, casing and coiled tubing.

EXAMPLES

The following examples are further illustrative. Examples 1 and 2 involve coatings that degrade when exposed to an alkaline-pH environment. Examples 3 and 4 are comparative examples and involve coatings that do not degrade when exposed to an alkaline-pH environment.

All examples employed the following testing procedure. External surfaces of 25-mm, stainless-steel tubing samples were wrapped with one or more layers of a film or resin sheet. The resin sheets were held in place with cable ties. The coated tubes were vertically placed at the center of plastic containers and glued to the bottom with silicone sealant. A 1890-kg/m$^3$ Class G cement slurry was then poured around the tubes. The cement was covered with a layer of water, and the containers were placed in an oven and allowed to cure at various temperatures at time periods.

Example 1

The external surface of three pieces of metal tubing was wrapped with one layer of polylactic-acid resin sheet. Each piece of tubing was wrapped with a different thickness of resin sheet: 40 μm, 100 μm and 350 μm. A fourth piece of metal tubing was left uncoated as a control.

After the tubes were glued in place, the annuli between the metal tubes and the container walls were filled with cement slurry, a layer of water was poured on the cement-slurry surface, and the containers were placed in a 60° C. oven. The containers were cured for approximately 40 hours.

Upon removal from the oven, no gap was observed between the exterior surface of the uncoated tubing and the cement sheath. Gaps were observed between the exterior surfaces of the coated tubing samples and their respective cement sheaths. It was also possible to remove the coated tubes from the set cement. The tube coated with 350-μm resin sheet was the easiest to remove.

Example 2

Three layers of 350-μm-thick polylactic-acid resin sheet were wrapped around one piece of metal tubing, providing a layer with a thickness of approximately 1 mm After the tube was glued in place, the annulus between the metal tube and the container wall was filled with cement slurry, and the water layer was applied, and the container was placed in an 85° C. oven. The container was cured for approximately 10 days.

Upon removal from the oven, a gap was observed between the exterior surface of the tubing and the cement sheath. The tube was easily removed from the cement sheath. Residual resin film was also observed on the surface of the metal tube, as well as the cement sheath.

Example 3

A layer of 0.74-mm-thick Parafilm M tape was wrapped around one piece of metal tubing. After the tube was glued in place, the annulus between the metal tube and the container wall was filled with cement slurry, and the water layer was applied, and the container was placed in a 60° C. oven. The container was cured for approximately one week.

Upon removal from the oven, no gap was observed between the exterior surface of the tubing and the cement sheath. The cement was tight against the layer of tape. However, the tube could slide out of the container from the inside of the tape layer. The thickness the tape was measured at several locations, and found to be 0.75 mm Within experimental error, this is the original tape thickness, indicated that no degradation occurred upon exposure to cement.

Example 4

Several layers of 0.09-mm-thick PTFE tape was wrapped around one piece of metal tubing to obtain a combined thickness of 0.74 mm Cable ties were not necessary in this instance. After the tube was glued in place, the annulus between the metal tube and the container wall was filled with cement slurry, and the water layer was applied, and the container was placed in a 60° C. oven. The container was cured for approximately one week.

Upon removal from the oven, no gap was observed between the exterior surface of the tubing and the cement sheath. The cement was tight against the layer of tape. The tube was easily removed from the cement sample; however, the tape came away with the tube owing to its adhesive nature. The PTFE tape maintained its properties and did not degrade.

The invention claimed is:

1. A method for cementing a subterranean well comprising a borehole wall, comprising:
    applying a coating along the exterior surface of a tubular body, wherein, upon exposure to a well cement, the coating becomes unstable and degrades;
    installing the tubular body in the subterranean well;
    placing a cement slurry in the annular region between external surface of the tubular body and the borehole wall, thereby creating a cement sheath; and
    allowing the coating to degrade, thereby creating a gap between the cement sheath and the external surface of the tubular body.

2. The method of claim 1, wherein the coating is applied only at desired locations along the tubular body.

3. The method of claim 1, wherein the coating is one or more members selected from the group consisting of polyamides, polycarbonates and polyesters.

4. The method of claim 1, wherein the coating is one or more members of the group consisting of polylactic acid and polyglycolic acid.

5. The method of claim 1, wherein the molecular weight of the coating is between about 1000 and 1,000,000.

6. The method of claim 1, wherein the coating thickness is between about 40 μm and 1 cm.

7. A method for completing a subterranean well comprising a borehole wall, comprising:
    applying a coating along the exterior surface of a tubular body, wherein, upon exposure to a well cement, the coating becomes unstable and degrades;
    installing the tubular body in the subterranean well;
    placing a cement slurry in the annular region between external surface of the tubular body and the borehole wall, thereby creating a cement sheath;
    allowing the coating to degrade, thereby creating a gap between the cement sheath and the external surface of the tubular body; and
    performing one or more hydraulic-fracturing treatments.

8. The method of claim 7, further comprising performing an acidizing treatment before performing the hydraulic-fracturing treatment.

9. The method of claim 7, wherein the coating is applied only at desired locations along the tubular body.

10. The method of claim 7, wherein the coating is one or more members selected from the group consisting of polyamides, polycarbonates and polyesters.

11. The method of claim 7, wherein the coating is one or more members of the group consisting of polylactic acid and polyglycolic acid.

12. The method of claim 7, wherein the molecular weight of the coating is between about 1000 and 1,000,000.

13. The method of claim 7, wherein the coating thickness is between about 40 μm and 1 cm.

14. The method of claim 7, wherein the cement is one or more members selected from the group consisting of Portland cement, calcium aluminate cement, fly ash, blast furnace slag, lime-silica blends, geopolymers and chemically bonded phosphate ceramics.

* * * * *